(12) United States Patent
Cox

(10) Patent No.: US 10,321,180 B2
(45) Date of Patent: *Jun. 11, 2019

(54) NEWS PRODUCTION SYSTEM WITH DYNAMIC CHARACTER GENERATOR OUTPUT

(71) Applicant: Tribune Broadcasting Company, LLC, Chicago, IL (US)

(72) Inventor: Gary Wilson Cox, Sacramento, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,441

(22) Filed: May 7, 2018

(65) Prior Publication Data

US 2018/0255337 A1    Sep. 6, 2018

Related U.S. Application Data

(63) Continuation of application No. 14/809,669, filed on Jul. 27, 2015, now Pat. No. 10,003,841.

(51) Int. Cl.
*H04N 5/272* (2006.01)
*H04N 21/237* (2011.01)
(Continued)

(52) U.S. Cl.
CPC ......... *H04N 21/2668* (2013.01); *G06Q 30/02* (2013.01); *H04N 5/272* (2013.01);
(Continued)

(58) Field of Classification Search
CPC ........... H04N 21/236; H04N 21/23617; H04N 21/237; H04N 21/23614; H04N 21/262; H04N 21/8153; H04N 5/272
See application file for complete search history.

(56) References Cited

U.S. PATENT DOCUMENTS 5,758,257 A * 5/1998 Herz .................... G06Q 20/383
348/E7.056
6,268,849 B1 * 7/2001 Boyer ................ H04N 7/17318
725/40
(Continued)

FOREIGN PATENT DOCUMENTS

JP        2005333279 A     12/2005
KR    1020040080224 A      9/2004

OTHER PUBLICATIONS

International Search Report dated Oct. 28, 2016 issued in connection with International Application No. PCT/US2016/043625 filed Jul. 22, 2016, 3 pages.

(Continued)

*Primary Examiner* — James R Sheleheda
(74) *Attorney, Agent, or Firm* — McDonnell Boehnen Hulbert & Berghoff LLP

(57) ABSTRACT

In one aspect, an example method involves: using, by a computing device, data associated with multiple elections to generate a set of ordered content items, wherein each content item of the set of ordered content items includes content associated with a respective one of the multiple elections, and wherein the set of ordered content items is used to generate a video stream representing video content; using, by a computing device, at least a portion of the data to make a determination that a status of one of the multiple elections satisfies each condition in a condition set; and based, at least in part, on the determination, while the video stream is being generated, modifying, by the computing device, the set of ordered content items, thereby causing the video content to be modified.

20 Claims, 8 Drawing Sheets

(51) Int. Cl.
*H04N 21/2668* (2011.01)
*H04N 21/262* (2011.01)
*H04N 21/236* (2011.01)
*H04N 21/81* (2011.01)
*H04N 21/258* (2011.01)
*H04N 21/854* (2011.01)
*G06Q 30/02* (2012.01)
*H04N 21/25* (2011.01)

(52) U.S. Cl.
CPC ..... *H04N 21/237* (2013.01); *H04N 21/23617* (2013.01); *H04N 21/252* (2013.01); *H04N 21/25891* (2013.01); *H04N 21/262* (2013.01); *H04N 21/8126* (2013.01); *H04N 21/8153* (2013.01); *H04N 21/854* (2013.01)

(56) References Cited

U.S. PATENT DOCUMENTS

| | | | | |
|---|---|---|---|---|
| 6,460,018 | B1* | 10/2002 | Kasai | G06Q 10/06314 705/7.21 |
| 6,941,515 | B1* | 9/2005 | Wilkins | G06T 11/60 715/717 |
| 6,947,966 | B1* | 9/2005 | Oko, Jr. | G06Q 20/3678 235/382 |
| 7,835,920 | B2* | 11/2010 | Snyder | G06F 3/0481 705/1.1 |
| 8,789,124 | B1 | 7/2014 | Malaby et al. | |
| 9,049,386 | B1* | 6/2015 | Hundemer | H04N 21/23412 |
| 9,049,389 | B2* | 6/2015 | Hashimoto | H04N 5/353 |
| 9,264,752 | B1* | 2/2016 | Hundemer | H04N 21/26258 |
| 9,271,019 | B1* | 2/2016 | Malaby | H04N 7/173 |
| 9,674,464 | B2* | 6/2017 | Cox | G11B 27/029 |
| 9,883,246 | B2* | 1/2018 | Cox | H04N 21/854 |
| 2003/0195798 | A1 | 10/2003 | Goci | |
| 2003/0226152 | A1* | 12/2003 | Billmaier | H04N 7/163 725/135 |
| 2004/0008220 | A1* | 1/2004 | Snyder | G06F 3/0481 715/716 |
| 2004/0078814 | A1* | 4/2004 | Allen | H04N 5/44513 725/47 |
| 2007/0242082 | A1* | 10/2007 | Lathrop | G06F 16/56 345/619 |
| 2008/0140513 | A1* | 6/2008 | Walden | G06Q 30/02 705/7.29 |
| 2009/0077059 | A1* | 3/2009 | Torres | G06Q 40/00 |
| 2009/0132378 | A1* | 5/2009 | Othmer | G06Q 30/0243 705/14.42 |
| 2012/0291067 | A1* | 11/2012 | Wiles | H04H 60/06 725/35 |
| 2012/0302156 | A1* | 11/2012 | Anstandig | H04H 60/06 455/2.01 |
| 2013/0304828 | A1* | 11/2013 | Robertson | H04L 65/403 709/206 |
| 2014/0229841 | A1 | 8/2014 | Muller et al. | |
| 2014/0380195 | A1* | 12/2014 | Graham | G06Q 50/01 715/753 |
| 2015/0067733 | A1* | 3/2015 | Weber | H04H 20/38 725/40 |
| 2015/0187155 | A1 | 7/2015 | Bolton et al. | |
| 2015/0294025 | A1* | 10/2015 | Wellen | G06F 17/20 715/202 |
| 2015/0304605 | A1* | 10/2015 | Hartman | H04N 7/15 725/109 |
| 2016/0027061 | A1* | 1/2016 | Chakraborty | G06Q 30/0269 705/14.66 |
| 2017/0083943 | A1* | 3/2017 | Bosworth | G06Q 30/0255 |

OTHER PUBLICATIONS

Written Opinion dated Oct. 28, 2016 issued in connection with International Application No. PCT/US2016/043625 filed Jul. 22, 2016, 4 pages.

\* cited by examiner

400

402a U.S. Senator (NY): John Tavares 65%, Nick Leddy 35%, 70% of Precincts Reporting 402b U.S. Senator (CA): Roberta Luongo 60%, Ryan Kesler 40%, 5% of Precincts Reporting 402c U.S. Senator (IL): Marcus Kruger 51%, Andrew Shaw 49%, 80% of Precincts Reporting 402d U.S. Senator (PA): Claude Giroux 90%, Chris Pronger 10%, 90% of Precincts Reporting

| |
|---|
| U.S. Senator (IL): Marcus Kruger 51%, Andrew Shaw 49%, 80% of Precincts Reporting |
| U.S. Senator (NY): John Tavares 65%, Nick Leddy 35%, 70% of Precincts Reporting |
| U.S. Senator (CA): Roberta Luongo 60%, Ryan Kesler 40%, 5% of Precincts Reporting |
| U.S. Senator (PA): Claude Giroux 90%, Chris Pronger 10%, 90% of Precincts Reporting |

| | |
|---|---|
| 402a | U.S. Senator (NY): John Tavares 65%, Nick Leddy 35%, 70% of Precincts Reporting |
| 402b | U.S. Senator (CA): Roberta Luongo 60%, Ryan Kesler 40%, 5% of Precincts Reporting |
| 402c | U.S. Senator (IL): Marcus Kruger 51%, Andrew Shaw 49%, 80% of Precincts Reporting |
| 402d | U.S. Senator (New York): Dan Boyle 65%, Rick Nash 35%, 70% of Precincts Reporting |
| 402e | U.S. Senator (CA): Roberta Luongo 60%, Ryan Kesler 40%, 5% of Precincts Reporting |

NEWS PRODUCTION SYSTEM WITH DYNAMIC CHARACTER GENERATOR OUTPUT

REFERENCE TO RELATED APPLICATION

This disclosure is a continuation of, and claims priority to, U.S. patent application Ser. No. 14/809,669 filed Jul. 27, 2015.

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

A news production system (NPS) may generate and output a video stream representing a news program. The NPS may include various components to aid in the process of generating and outputting the video stream. For example, the NPS may include a scheduling system, which may provide a user interface that allows a user (e.g., a producer or technical director) to create and/or edit a program schedule of the news program. The scheduling system may then process records in the program schedule, and based on the processed records, control one or more devices, systems, or other entities of the NPS to facilitate generating and outputting the video stream.

The NPS may also include a character generator, which may use a set of ordered content items to generate a video stream representing video content that includes the content items in the specified order.

SUMMARY

In a first aspect, an example method includes: using, by a computing device, data associated with multiple elections to generate a set of ordered content items, wherein each content item of the set of ordered content items includes content associated with a respective one of the multiple elections, and wherein the set of ordered content items is used to generate a video stream representing video content; using, by a computing device, at least a portion of the data to make a determination that a status of one of the multiple elections satisfies each condition in a condition set; and based, at least in part, on the determination, while the video stream is being generated, modifying, by the computing device, the set of ordered content items, thereby causing the video content to be modified.

In a second aspect, an example non-transitory computer-readable medium has stored thereon, program instructions that when executed by a processor, cause the computing device to perform a set of acts including: using data associated with multiple elections to generate a set of ordered content items, wherein each content item of the set of ordered content items includes content associated with a respective one of the multiple elections, and wherein the set of ordered content items is used to generate a video stream representing video content; using at least a portion of the data to make a determination that a status of one of the multiple elections satisfies each condition in a condition set; and based, at least in part, on the determination, while the video stream is being generated, modifying the set of ordered content items, thereby causing the video content to be modified.

In a third aspect, an example system includes a character generator, wherein the system is configured to perform a set of acts including: using data associated with multiple elections to generate a set of ordered content items, wherein each content item of the set of ordered content items includes content associated with a respective one of the multiple elections, and wherein the character generator uses the set of ordered content items to generate a video stream representing video content; using at least a portion of the data to make a determination that a status of one of the multiple elections satisfies each condition in a condition set; and based, at least in part, on the determination, while the video stream is being generated, modifying the set of ordered content items, thereby causing the video content to be modified.

BRIEF DESCRIPTION OF THE DRAWINGS

FIG. 4A is a simplified diagram of an example set of content items in a first state.

FIG. 4B is a simplified diagram of the set of content items of FIG. 4A, but in a second state.

FIG. 4C is a simplified diagram of the set of content items of FIG. 4A, but in a third state.

DETAILED DESCRIPTION

I. Overview

Figure 1:
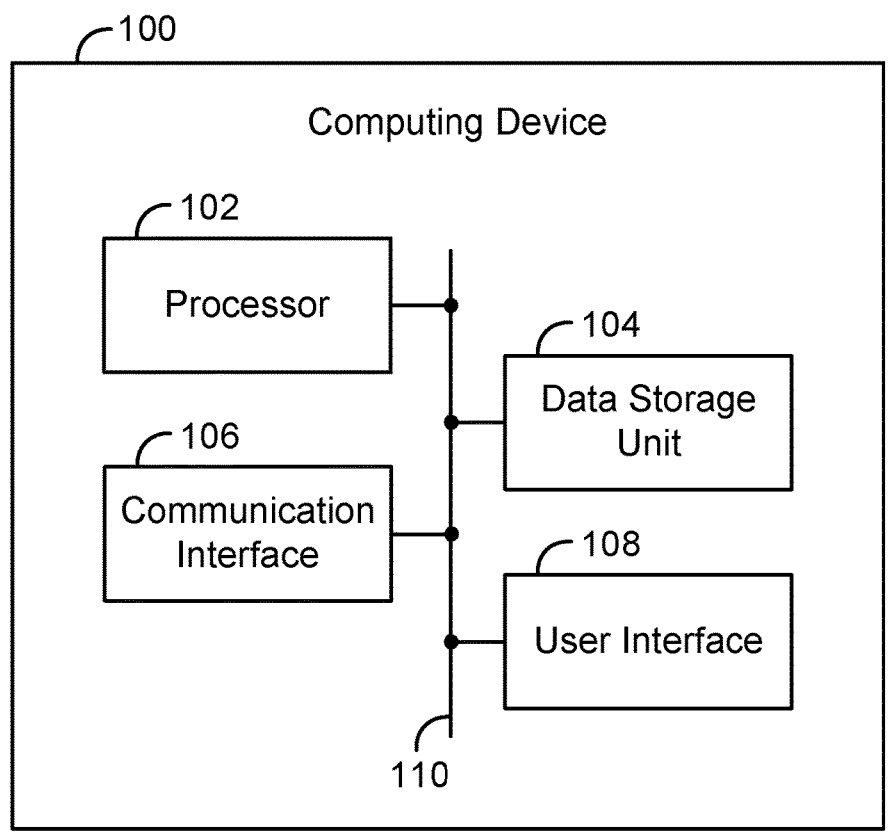
FIG. 1 is a simplified block diagram of an example computing device.

As noted above, a character generator may use a set of ordered content items to generate a video stream representing video content that includes the content items in the specified order. In a scenario where an NPS produces a news program that provides coverage of multiple elections, the content items may be generated based on data associated with the elections. Such data may indicate, for instance, a election identifier, candidate identifiers, and a total number of tabulated votes for each candidate of the election.

As such, in one example, the set of ordered content items may include a first content item that includes first election information, a second content item that includes second election information, and a third content item that includes third election information. In some instances, such as where the set of ordered content items includes many content items, the video content may present the content items in a scrolling or rotating fashion. For example, the video content may present the set of ordered content items as a continuous stream of content that scrolls from right to left. For example, the video content may present the first election information scrolling from right to left, followed by the second election information scrolling from right to left, and so forth. In some cases, the scrolling or rotating may be repeated such that the content items are presented in a cyclical fashion.

In some instances, a producer may organize and define an order for the content items before production of the news program, perhaps based on an expected level of popularity associated with the content items, such that the content items are presented in the same order in the video content. For example, if the producer expects the first election to be more popular than the second election, the producer may position the first content item before the second content item in the set of ordered content items. As a result, by using the set of ordered content items, the character generator generates video content that includes the first election information positioned before the second election information.

In some instances though, it may be desired to modify the video stream generated by the character generator during production of the news program. For example, where the second election starts to becomes more popular than the first election after production of the news program has begun, it may be desired to modify the video stream such that the second election information is positioned before the first election information in the video content.

The present disclosure provides an NPS that helps address this issue. In one aspect, the NPS includes an election system in addition to a character generator. The election system collects and organizes various types of election-related data, such as data associated with multiple elections.

The election system may use the data to generate a set of ordered content items, where each content item of the set includes content associated with a respective one of the multiple elections. The election system may then make a determination that a status of one of the multiple elections satisfies each condition in a condition set. This may indicate that the election has a threshold level of popularity. For example, if the status satisfies each condition in the condition set, this may indicate that the election is significantly close, significantly lopsided, or that an earlier projected outcome of the election was significantly inaccurate.

Based at least in part, on the determination, while the video stream is being generated, the election system may modify the set of ordered content items, thereby causing the video content to be modified. The election system may modify the set of ordered content items in various ways. For example, the election system may reorder a content item. As such, where a particular election is determined to have a threshold level of popularity, the election system may reposition within the set of ordered content items (e.g., by moving it closer to the beginning of the set) the content item corresponding to that election. This may result in the content item having a more prominent positon in the video content (i.e., one that is more likely to be viewed).

As another example, where a particular election is determined to have a threshold level of popularity, the election system may add a duplicate of the content item corresponding to that election to the set of content items. This may result in that content item (or a copy thereof) appearing more frequently in the video content.

II. Example Devices and Systems

FIG. 1 is a simplified block diagram of an example computing device 100. Computing device 100 may perform various acts and/or functions, such as those described in this disclosure (including the accompanying drawings). Computing device 100 may include various components, such as processor 102, data storage unit 104, communication interface 106, and/or user interface 108. These components may be connected to each other (or to another device, system, or other entity) via connection mechanism 110.

As used in this disclosure, the term connection mechanism means a mechanism that facilitates communication between two or more devices, systems, or other entities. A communication mechanism may be a relatively simple mechanism, such as a cable or system bus, or a relatively complex mechanism, such as a packet-based communication network (e.g., the Internet). In some instances, a connection mechanism may include a non-tangible medium (e.g., where the connection is wireless).

Processor 102 may include a general-purpose processor (e.g., a microprocessor) and/or a special-purpose processor (e.g., a digital signal processor (DSP)).

Data storage unit 104 may include one or more volatile, non-volatile, removable, and/or non-removable storage components, such as magnetic, optical, or flash storage, and/or may be integrated in whole or in part with processor 102. Further, data storage unit 104 may take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 may be configured to perform one or more acts and/or functions, such as those described in this disclosure. Such program instructions may define and/or be part of a discrete software application that can be executed in response to certain inputs being received from communication interface 106 and/or user interface 108, for instance. Data storage unit 104 may also store other types of data, such as those types described in this disclosure.

Communication interface 106 may allow computing device 100 to connect to and/or communicate with a device, system, or other entity according to one or more protocols. In one example, communication interface 106 may be a wired interface, such as an Ethernet interface or a high-definition serial-digital-interface (HD-SDI). In another example, communication interface 106 may be a wireless interface, such as a cellular or WI-FI interface. Each connection described in this disclosure may be a direct connection or an indirect connection, the latter being a connection that passes through and/or traverses one or more devices, systems, or other entities, such as such as a router, switcher, or other network device.

User interface 108 may facilitate interaction with a user of computing device 100, if applicable. As such, user interface 108 may include input components such as a keyboard, a keypad, a mouse, a touch-sensitive panel, a microphone, and/or a camera, and/or output components such as a display device (which, for example, may be combined with a touch-sensitive panel), a sound speaker, and/or a haptic feedback system.

Computing device 100 may take various forms, such as a workstation, a desktop computer, a laptop, a tablet, and/or a mobile phone.

Figure 2:
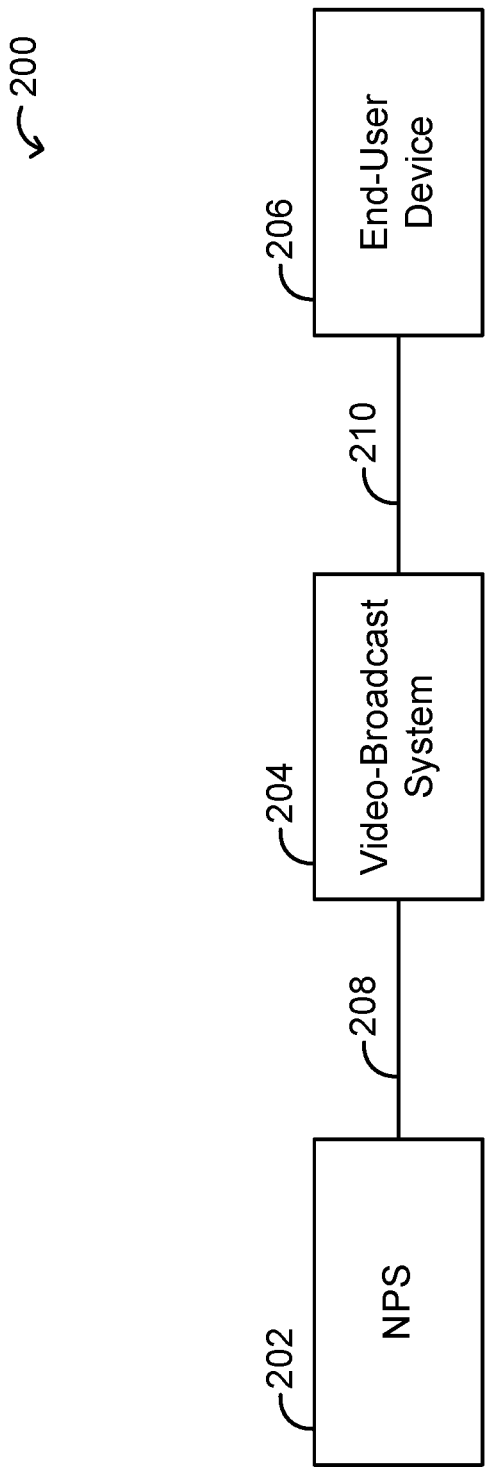
FIG. 2 is a simplified block diagram of an example system.

FIG. 2 is a simplified block diagram of an example system 200. System 200 may include various components, such as news production system (NPS) 202, video-broadcast system 204, and end-user device 206, each of which may be implemented as a computing device or a system that includes one or more computing devices. System 200 may also include connection mechanism 208, which connects NPS 202 with video-broadcast system 204; and connection mechanism 210, which connects video-broadcast system 204 with end-user device 206.

NPS 202 may generate a video stream representing a news program, and may then transmit the video stream to video-broadcast system 204. Video-broadcast system 204 may then receive the video stream and transmit the video stream to end-user device 206 for presentation of the represented video content to an end-user. In practice, video-broadcast system 204 may transmit the video stream to a large number of end-user devices for presentation of the represented video content to a large number of end-users.

A video stream may be transmitted according to a variety of different standards. For instance, a video stream may be transmitted according to the high-definition serial digital interface (HD-SDI) with a data transfer rate of 1.485 Gbps. In some instances, a video stream may be encoded and the encoded version of the video stream may be transmitted instead of the original video stream.

Figure 3:
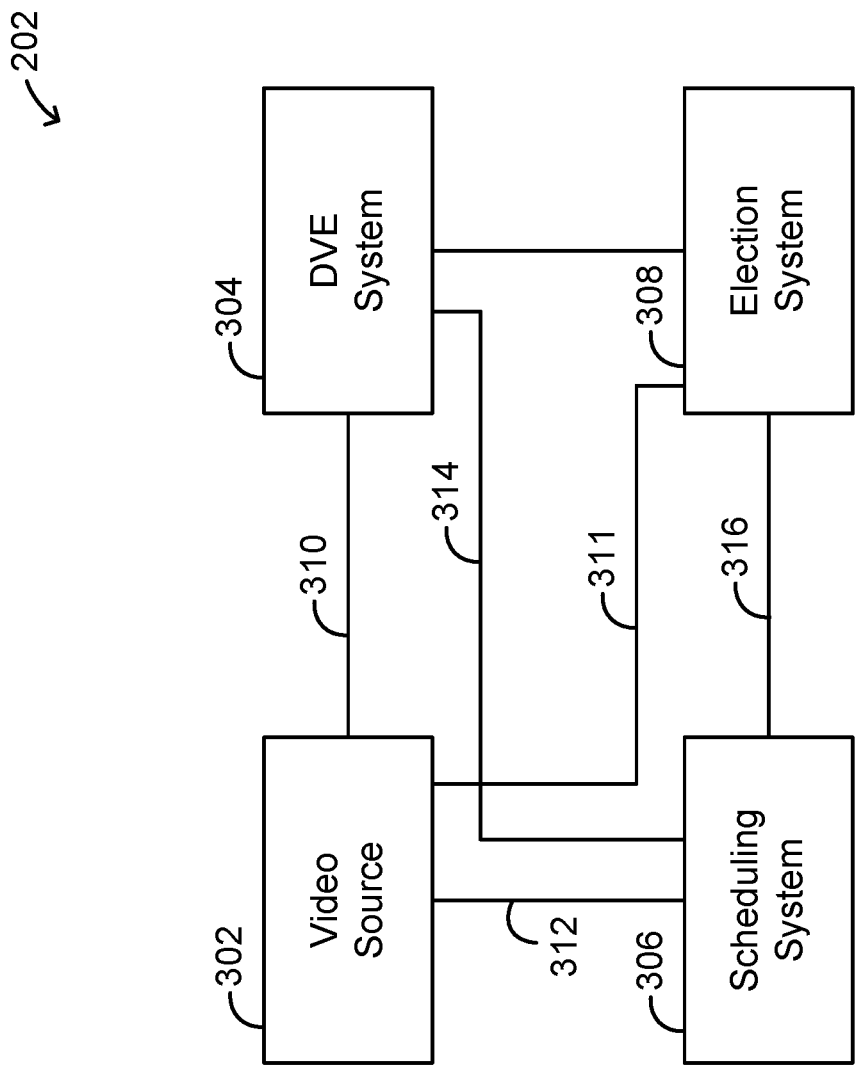
FIG. 3 is a simplified block diagram of another example system.

FIG. 3 is a simplified block diagram of an example NPS 202. NPS 202 may include various components, such as video source 302, DVE system 304, scheduling system 306, and election system 308, each of which may be implemented as computing device or a system that includes one or more computing devices. NPS 202 may also include connection mechanism 310, which connects video source 302 with DVE system 304; connection mechanism 311, which connects video source 302 to election system 308; connection mechanism 312, which connects scheduling system 306 with video source 302; connection mechanism 314, which connects scheduling system 306 with DVE system 304; and connection mechanism 316, which connects scheduling system 306 with election system 308.

Video source 302 may generate and/or output a video stream, and may transmit the video stream to DVE system 304. Video source 302 may take various forms, such as a video camera, a satellite receiver, a video server, or a character generator. An example video server is the K2 server provided by Grass Valley™ of San Francisco, Calif.

A character generator may generate a video stream based on input data. For example, a character generator may use an ordered set of content items to generate a video stream representing video content that includes the content items in the specified order. Such content items may include various types of content, such as text and/or images. The ordered set of content items may be stored in various forms, such as in the form of an extended markup Language (XML) file. As another example, the ordered set of content items may be stored as a flat file database including nested directories, where each directory includes a respective text file, and where each text file includes a number, name or other piece of election data. An example character generator is the Viz Trio provided by Viz Rt™ of Bergen Norway.

FIG. 4A helps illustrate an example set of content items for use with a character generator. FIG. 4A is a simplified diagram of a set 400 of content items in a first state. In the first state, set 400 includes four ordered content items 402a-d. Each content item 402a-d includes information related to a respective election, namely the name of the position being sought, the candidate's names, their respective tabulated vote percentages, and the percentage of precincts reporting.

It should be noted that set 400 has been greatly simplified for the purposes of illustrating certain features. In practice, a set of content items is likely to include more content items, and each content item is likely to include more and/or different content.

FIGS. 4B and 4C, which show set 400 in second and third states, respectively, are discussed in connection with Section III below.

DVE system 304 may execute a DVE, which may cause DVE system 304 to generate and/or output a video stream. DVE system 304 may then transmit the generated video stream to another device, system, or entity, such as video-broadcast system 204.

In one example, DVE system 304 may receive from video source 302, a video stream representing a video segment, and may execute a DVE, which causes DVE system 304 to modify the video segment and to generate and output a new video stream representing the modified video segment.

DVE system 304 may modify the video segment in various ways, such as by overlaying text, images, video, or other content thereon. For example, DVE system 304 may modify the video segment by overlaying a channel logo in a lower right-hand corner of the video segment. As another example, DVE system 304 may modify the video segment by overlaying a text box including text over a lower-third portion of the video segment. As yet another example, DVE system 304 may modify the video segment by overlaying election-related content on the video segment. In one example, the election-related content may be overlaid, perhaps in a scrolling or rotating fashion (sometimes referred to in the industry as a "scrolling carousel" or a "flipping carousel," respectively), on a rectangular-shaped area near the bottom of the video segment. This is sometimes referred to as a ticker.

Figure 5A:
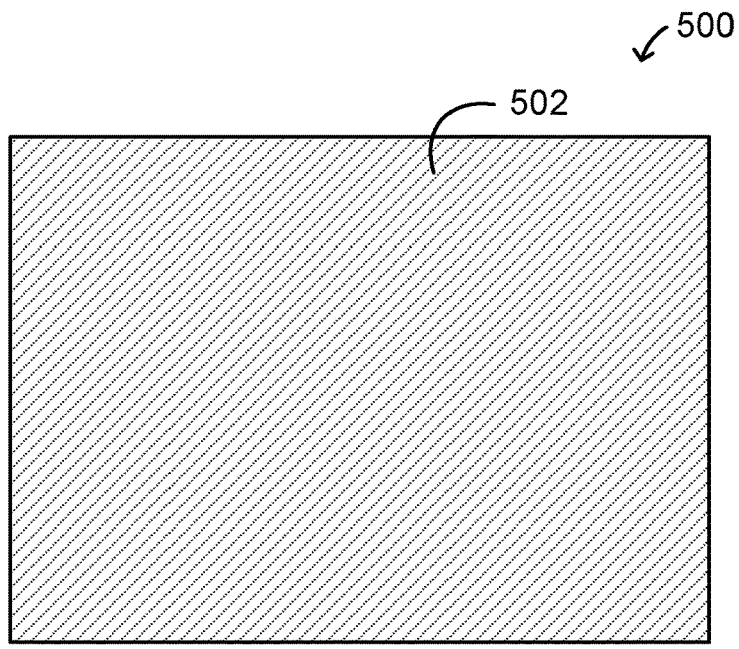
FIG. 5A is a simplified illustration of a frame of an example video segment, where no content is overlaid on the frame.
Figure 5B:
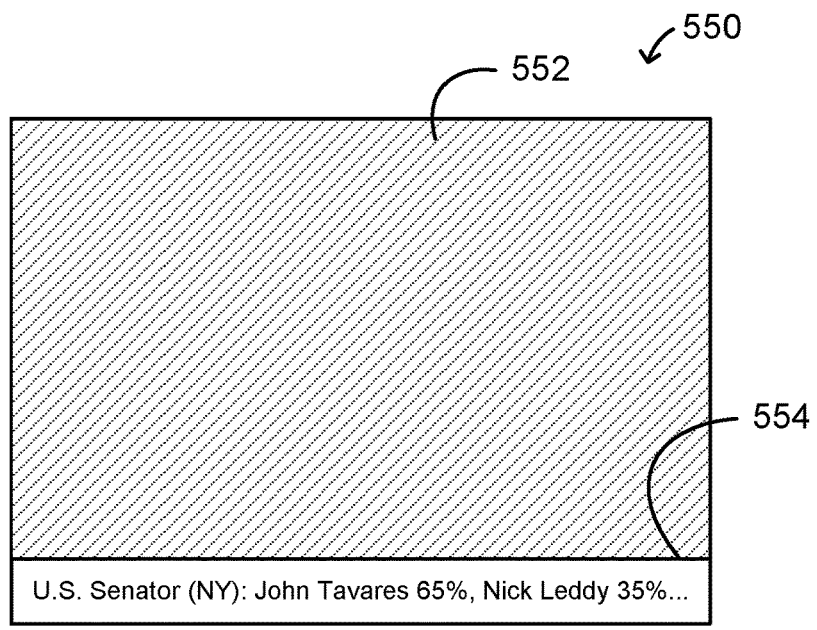
FIG. 5B is a simplified illustration of a frame of an example video segment, where a ticker is overlaid on the frame.

FIGS. 5A and 5B help illustrate the concept of overlaying a ticker on a video segment. FIG. 5A is a simplified diagram of a frame 500 of an example video segment. Frame 500 includes content 502, but does not include a ticker overlaid on content 502. For comparison, FIG. 5B is a simplified diagram of a frame 550 of an example video segment. Frame 552 includes content 552 and a ticker 554 overlaid on content 552. Ticker 554 currently presents a portion of content item 402a.

As noted above, DVE system 304 may execute a DVE, which causes DVE system 304 to generate a video stream by modifying a video segment represented by an existing video stream. However, as another example, DVE system 304 may execute a DVE, which causes DVE system 304 to generate a video stream without using an existing video stream. In this case, rather than overlaying content on an existing video segment, DVE system 304 may instead generate a new video segment, and may generate a video stream representing the generated video segment.

DVE system 304 may obtain content for use in connection with executing a DVE in various ways. For example, DVE system 304 may retrieve such content from a data storage unit in the DVE system. As another example, DVE system 304 may receive such content from another source, such as video source 302 or election system 308.

In practice, DVE system 304 may execute multiple DVEs in serial fashion. Further, in practice, NPS 202 may include multiple video sources and/or multiple DVE systems. For example, in one arrangement, each of multiple video sources may be connected to DVE system 304, and DVE system 304 may switch between one or more inputs as appropriate to execute a given DVE.

DVE system 304 may also perform other acts/or functions related to DVEs. For example, DVE system 304 may provide a user interface that allows a user to create and/or edit DVEs. When DVE system 304 creates a DVE, DVE system 304 may generate and store corresponding program instructions for later retrieval and execution. As such, the process of the DVE system 304 executing a DVE may involve DVE system retrieving and executing program instructions corresponding to the DVE.

DVE system 304 may take various forms, such as a production switcher. An example production switcher is the Vision Octane production switcher provided by Ross Video Ltd. of Iroquois, Ontario in Canada.

Scheduling system 306 may perform acts and/or functions related to scheduling and managing the production of a news program. For example, scheduling system 306 may provide a user interface that allows a user to create and/or edit a program schedule of a news program. Further, scheduling system 306 may process records in a program schedule. This may result in scheduling system 306 controlling one or more other devices, systems, or entities of the NPS 202 to cause NPS 202 to generate and/or output a video stream representing a news program. As such, based on a program schedule, scheduling system 306 may control video source 302 and DVE system 304.

A program schedule (sometimes referred to in the industry as a "rundown") serves as an outline of a news program and may include multiple records. A news program may be conceptually divided into multiple logically-separated portions (sometimes referred to in the industry as "stories"). As such, each portion of the news program may be represented by a separate record of the program schedule. Each record may include various types of information.

Election system 308 may facilitate the process of gathering, organizing, and outputting election-related data. Such data may come from various sources, such as from government-operated reporting systems, and may take various forms. Such data may indicate various types of information about elections, such as titles of political offices that are the subject of the elections, names and other information of candidates, amounts of votes cast and/or tabulated for candidates, amounts and identifies of precincts or other zones reporting tabulated votes, and/or projections of election outcomes.

In this disclosure, the terms "election" means any type of vote-based decision-making process. In one example, an election may involve a process where voters vote to determine which candidate obtains a political office. In another example, an election may involve a ballot-initiative process where voters vote to determine whether or not a proposed law becomes law. As such, an election may have various types of voting options.

Video-broadcast system 204 may distribute a video stream to an end-user device for presentation of video content represented by the video stream to an end-user. In practice, video-broadcast system 204 may distribute a video stream to a mass number of end-user devices for presentation of video content represented by the video stream to a mass number of end-users. Video-broadcast system 204 may include various systems or components, such as a terrestrial antenna or a satellite, and may be configured for distributing the video stream to end-user device 206 in various ways. For example, video-broadcast system 204 may distribute the video stream over-the-air or via a packet-based network such as the Internet.

End-user device 206 may present video content represented by a received video stream to an end-user. End-user device 26 may take a variety of forms, such as a television, a television set-top box, and/or a computing device. As used throughout this disclosure, the term video-broadcast means the distribution of video via any means.

In some examples, in addition to generating and outputting a video stream representing video content, NPS 202 may generate and output an audio stream representing corresponding audio content. Similarly, in some examples, a video-broadcast system may be integrated with an audio-broadcast system, such that a video stream representing video content may be broadcast together with an audio stream representing corresponding audio content. Likewise, in some examples, in addition to presenting video content represented by a video stream, end-user device 206 may present corresponding audio content represented by a received audio stream. In any of these examples, a video stream and an audio stream may be combined into a single media stream.

III. Example Operations

In one aspect, election system 308 may perform various acts, which will now be described. First, election system 308 may access data associated with multiple elections, such as by receiving such data from a data storage unit.

Election system 308 may use the data to generate a set of ordered content items, where each content item of the set includes content associated with a respective one of the multiple elections. For example, election system may use the data to generate set 400 in the first state as shown in FIG. 4A.

Next, video source 302 may use the generated set of ordered content to generate a video stream representing the content items in the specified order. For example, this may involve a character generator using set 400 to generate a video stream (e.g., in the form of a ticker) representing video content that includes content items 402*a-d* in that order.

Next, election system 308 may make a determination that a status of one of the multiple elections satisfies each condition in a condition set. This may indicate that the election has a threshold level of popularity. For example, if the status satisfies each condition in the condition set, this may indicate that the election is significantly close, significantly lopsided, or that an earlier projected outcome of the election was significantly inaccurate.

The condition set may include one or more conditions. In a first example, the condition set may include a condition that at least a threshold amount of votes cast in connection with the election have been tabulated. In some instances, if this condition is satisfied, this may indicate that there are a significant amount of votes that have been tabulated.

In a second example, the condition set may include a condition that a difference between an amount of votes tabulated for a first candidate of the election and an amount of votes tabulated for a second candidate of the election is at most a threshold amount. In some instances, if this condition is satisfied, this may indicate that the election is significantly close.

In a third example, the condition set may include a condition that a difference between an amount of votes tabulated for a first candidate of the election and an amount of votes tabulated for a second candidate of the election is at least a threshold amount. In some instances, if this condition is satisfied, this may indicate that the election is significantly lopsided.

In a fourth example, the condition set may include a condition that a first projected outcome of the election and a second projected outcome of the election differ by at least a threshold extent, where the first projected outcome of the election is determined before the second projected outcome of the election is determined. In some instances, if this condition is satisfied, this may indicate that an earlier projection of the outcome of the election was significantly inaccurate. The condition set may include any of these or other conditions in any combination.

In a fifth example, the condition set may include a condition that voter-turnout associated with the election is at least a threshold amount. In one example, scheduling system 306 may determine a voter-turnout amount by comparing an amount of voters registered in a given geographic area (e.g., covering one or more precincts associated with the election)

with a corresponding amount of votes tabulated. In some instances, if this condition is satisfied, this may indicate that the election has significantly high voter turnout.

In a sixth example, the condition set may include a condition that voter turnout associated with the election is at most a threshold amount. In some instances, if this condition is satisfied, this may indicate that the election has significantly low voter turnout.

In a seventh example, the condition set may include a condition that the election is a subject of a threshold extent of social-media activity. In one example, the threshold extent of social-media activity may be a threshold amount of social-media activity. In one implementation, scheduling system 306 may determine an amount of social media-activity by querying a social media database (e.g., a database of Twitter or Facebook postings) and determining how many postings include a term related to the election, perhaps during a specified time period. In another example, the threshold extent of social-media activity may be a threshold change in social-media activity. In one implementation, scheduling system 306 may determine a change in social-media activity by comparing amounts of social-media activity across multiple time periods. In some instances, scheduling system 306 may compare activity in one election with activity in other elections to determine whether the activity of that election breaks from a trend of the others. In some instances, if this condition is satisfied, this may indicate that public interest in the election is relatively high.

Based at least in part, on the determination, while the video stream is being generated, election system 308 may modify the set of ordered content items, thereby causing the video content to be modified.

Election system 308 may modify the set of ordered content items in various ways. For example, election system 308 may reorder a content item. As such, where a particular election is determined to have a threshold level of popularity, the election system may re-position within the set of ordered content items (e.g., by moving it closer to the beginning of the set) the content item corresponding to that election. For instance, election system 308 may make a determination that a status of the election associated with content item 402c satisfied each condition in a condition set, and based on the determination, election system 308 may modify set 400 by reordering content item 402c such that the modified order of set 400 is content item 402c, 402a, 402b, and 402d. This may result in content item 402c having a more prominent positon in the video content (i.e., one that is more likely to be viewed). FIG. 4B is a simplified diagram of set 400 in a second state, namely a state after set 400 is modified as described above.

As another example, where a particular election is determined to have a threshold level of popularity, election system 308 may add a duplicate of the content item corresponding with that election to the set of content items. For instance, election system 308 may make a determination that a status of the election associated with content item 402b satisfied each condition in a condition set, and based on the determination, election system 308 may modify set 400 by adding a duplicate of content item 402b (the duplicate being referred to as 402e) to set 400 such that set 400 includes content items 402a-e in that order. This may result is content item 402b (or a copy thereof) appearing more frequently (i.e., as content item 402b or 402e) in the video content. FIG. 4C is a simplified diagram of set 400 in a third state, namely a state after set 400 is modified as described above. Other example ways of modifying the set of ordered content items are also possible.

Figure 6:
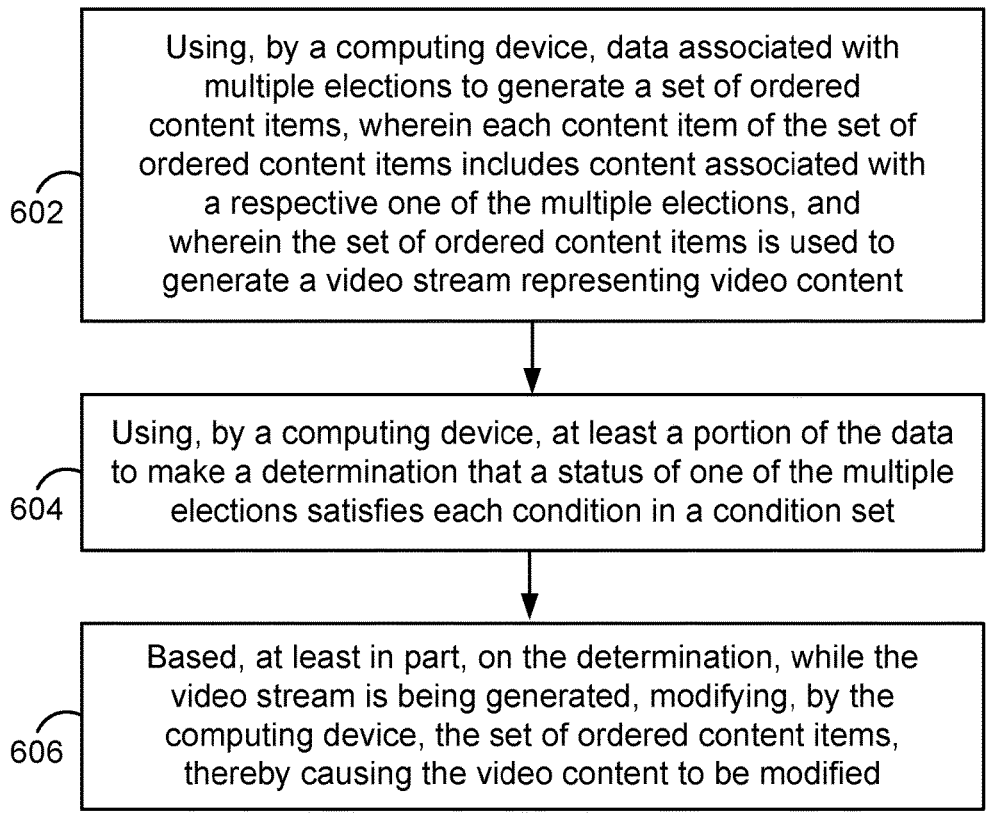
FIG. 6 is a flow chart illustrating an example method.

FIG. 6 is a flow chart illustrating an example method 600. At block 602, method 600 may include using, by a computing device, data associated with multiple elections to generate a set of ordered content items, wherein each content item of the set of ordered content items includes content associated with a respective one of the multiple elections, and wherein the set of ordered content items is used to generate a video stream representing video content.

At block 604, method 600 may include using, by a computing device, at least a portion of the data to make a determination that a status of one of the multiple elections satisfies each condition in a condition set.

At block 606, method 600 may include based, at least in part, on the determination, while the video stream is being generated, modifying, by the computing device, the set of ordered content items, thereby causing the video content to be modified.

IV. Example Variations

Each of the systems, devices, or other entities described in this disclosure may or may not be a discrete entity. As such, each of the described entities may be made up of multiple discrete entities. Further, two or more of the described entities may be combined into a single discrete entity.

Although some of the acts and/or functions described in this disclosure have been described as being performed by a particular entity (e.g., election system 308), such acts and/or functions may be performed by any entity, such as those described in this disclosure (e.g., video source 302). Further, although the described acts and/or functions have been recited in a particular order, the acts and/or functions need not be performed in the order recited. However, in some instances, it may be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations may also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    using, by a computing device, data associated with multiple sets of voting options to generate a set of ordered content items, wherein each content item of the set of ordered content items includes vote content of a respective set of the multiple sets of voting options, and wherein the set of ordered content items is used to generate a video stream representing video content; and
    while the video stream is being generated:
        using, by the computing device, at least a portion of the data to make a determination that a status of one set of voting options of the multiple sets of voting options satisfies each condition in a condition set; and
        based, at least in part, on the determination, modifying, by the computing device, the set of ordered content items by (i) reordering a content item of the set of ordered content items relative to the other content items of the set of ordered content items or (ii) adding to the set of ordered content items a duplicate of a content item of the set of ordered content items, thereby causing the video content to be modified.

2. The method of claim 1, wherein a character generator uses the set of ordered content items to generate the video stream representing video content.

3. The method of claim 1, wherein the video content presents the set of ordered content items in a scrolling fashion.

4. The method of claim 1, wherein the video content presents the set of ordered content items in a rotating fashion.

5. The method of claim 1, wherein the video content presents the set of ordered content items in a repeated fashion.

6. The method of claim 1, wherein the condition set comprises at least one condition from the group consisting of:
- a first condition that at least a threshold amount of votes cast in connection with the one set of voting options have been tabulated;
- a second condition that a difference between an amount of votes tabulated for a first candidate of the one set of voting options and an amount of votes tabulated for a second candidate of the one set of voting options is at most a threshold amount;
- a third condition that a difference between an amount of votes tabulated for a first candidate of the one set of voting options and an amount of votes tabulated for a second candidate of the one set of voting options is at least a threshold amount;
- a fourth condition that a first projected outcome of an election associated with the one set of voting options and a second projected outcome of the election differ by at least a threshold extent, wherein the first projected outcome of the election is determined before the second projected outcome of the election is determined;
- a fifth condition that voter-turnout associated with the one set of voting options is at least a threshold amount;
- a sixth condition that voter turnout associated with the one set of voting options is at most a threshold amount; and
- a seventh condition that the one set of voting options is a subject of a threshold extent of social-media activity.

7. The method of claim 1, wherein using at least a portion of the data to make a determination that a status of one set of voting options of the multiple sets of voting options satisfies each condition in a condition set comprises making a determination that (i) an election associated with the one set of voting options is significantly close, (ii) the election associated with the one set of voting options is significantly lopsided, or (iii) an earlier projected outcome of the election associated with the one set of voting options was significantly inaccurate.

8. The method of claim 1, further comprising:
transmitting the video stream to an end-user device for presentation of the video content to an end-user.

9. A non-transitory computer-readable medium having stored thereon program instructions that, when executed by a processor, cause a computing device to perform a set of acts comprising:
using data associated with multiple sets of voting options to generate a set of ordered content items, wherein each content item of the set of ordered content items includes vote content of a respective set of the multiple sets of voting options, and wherein the set of ordered content items is used to generate a video stream representing video content; and while the video stream is being generated:
using at least a portion of the data to make a determination that a status of one set of voting options of the multiple sets of voting options satisfies each condition in a condition set; and
based, at least in part, on the determination, modifying the set of ordered content items by (i) reordering a content item of the set of ordered content items relative to the other content items of the set of ordered content items or (ii) adding to the set of ordered content items a duplicate of a content item of the set of ordered content items, thereby causing the video content to be modified.

10. The computer-readable medium of claim 9, wherein a character generator uses the set of ordered content items to generate the video stream representing video content.

11. The computer-readable medium of claim 9, wherein the video content presents the set of ordered content items in a scrolling or rotating fashion.

12. The computer-readable medium of claim 9, wherein the video content presents the set of ordered content items in a repeated fashion.

13. The computer-readable medium of claim 9, wherein the condition set comprises at least one condition from the group consisting of:
- a first condition that at least a threshold amount of votes cast in connection with the one set of voting options have been tabulated;
- a second condition that a difference between an amount of votes tabulated for a first candidate of the one set of voting options and an amount of votes tabulated for a second candidate of the one set of voting options is at most a threshold amount;
- a third condition that a difference between an amount of votes tabulated for a first candidate of the one set of voting options and an amount of votes tabulated for a second candidate of the one set of voting options is at least a threshold amount;
- a fourth condition that a first projected outcome of an election associated with the one set of voting options and a second projected outcome of the election differ by at least a threshold extent, wherein the first projected outcome of the election is determined before the second projected outcome of the election is determined;
- a fifth condition that voter-turnout associated with the one set of voting options is at least a threshold amount;
- a sixth condition that voter turnout associated with the one set of voting options is at most a threshold amount; and
- a seventh condition that the one set of voting options is a subject of a threshold extent of social-media activity.

14. The computer-readable medium of claim 9, wherein using at least a portion of the data to make a determination that a status of one set of voting options of the multiple sets of voting options satisfies each condition in a condition set comprises making a determination that (i) an election associated with the one set of voting options is significantly close, (ii) the election associated with the one set of voting options is significantly lopsided, or (iii) an earlier projected outcome of the election associated with the one set of voting options was significantly inaccurate.

15. A system comprising:
one or more processors;
one or more data storage units; and
program instructions, stored in the one or more data storage units, that upon execution by the one or more processors cause the system to perform a set of acts comprising:

using data associated with multiple sets of voting options to generate a set of ordered content items, wherein each content item of the set of ordered content items includes vote content of a respective set of the multiple sets of voting options, and wherein the set of ordered content items is used to generate a video stream representing video content; and while the video stream is being generated:
  using at least a portion of the data to make a determination that a status of one set of voting options of the multiple sets of voting options satisfies each condition in a condition set; and
  based, at least in part, on the determination, modifying the set of ordered content items by (i) reordering a content item of the set of ordered content items relative to the other content items of the set of ordered content items or (ii) adding to the set of ordered content items a duplicate of a content item of the set of ordered content items, thereby causing the video content to be modified.

16. The system of claim 15, wherein the video content presents the set of ordered content items in a scrolling or rotating fashion.

17. The system of claim 15, wherein the video content presents the set of ordered content items in a repeated fashion.

18. The system of claim 15, wherein the condition set comprises at least one condition from the group consisting of:
  a first condition that at least a threshold amount of votes cast in connection with the one set of voting options have been tabulated;
  a second condition that a difference between an amount of votes tabulated for a first candidate of the one set of voting options and an amount of votes tabulated for a second candidate of the one set of voting options is at most a threshold amount;
  a third condition that a difference between an amount of votes tabulated for a first candidate of the one set of voting options and an amount of votes tabulated for a second candidate of the one set of voting options is at least a threshold amount;
  a fourth condition that a first projected outcome of an election associated with the one set of voting options and a second projected outcome of the election differ by at least a threshold extent, wherein the first projected outcome of the election is determined before the second projected outcome of the election is determined;
  a fifth condition that voter-turnout associated with the one set of voting options is at least a threshold amount;
  a sixth condition that voter turnout associated with the one set of voting options is at most a threshold amount; and
  a seventh condition that the one set of voting options is a subject of a threshold extent of social-media activity.

19. The system of claim 15, wherein using at least a portion of the data to make a determination that a status of one set of voting options of the multiple sets of voting options satisfies each condition in a condition set comprises making a determination that (i) an election associated with the one set of voting options is significantly close, (ii) the election associated with the one set of voting options is significantly lopsided, or (iii) an earlier projected outcome of the election associated with the one set of voting options was significantly inaccurate.

20. The system of claim 15, the set of acts further comprising:
  transmitting the video stream to an end-user device for presentation of the video content to an end-user.

* * * * *